United States Patent [19]

Kruse et al.

[11] 4,284,737

[45] Aug. 18, 1981

[54] PROCESS FOR DEWATERING A GRAFTED RUBBER LATEX

[75] Inventors: Robert L. Kruse, Belchertown; Wan C. Wu, Longmeadow, both of Mass.

[73] Assignee: Monsanto Company, St Louis, Mich.

[21] Appl. No.: 91,439

[22] Filed: Nov. 5, 1979

Related U.S. Application Data

[63] Continuation-in-part of Ser. No. 945,983, Sep. 27, 1978, abandoned.

[51] Int. Cl.$^3$ ............................................ C08F 279/04
[52] U.S. Cl. ................................... 525/243; 528/487; 528/492
[58] Field of Search ............... 525/316, 243; 528/487, 528/492

[56] References Cited

U.S. PATENT DOCUMENTS

| | | | |
|---|---|---|---|
| 2,576,909 | 12/1951 | Adams | 528/487 |
| 3,875,104 | 4/1975 | Siegele | 528/487 |
| 3,950,455 | 4/1976 | Okamoto | 525/316 |
| 3,957,912 | 5/1976 | Cincera | 525/316 |

*Primary Examiner*—Paul R. Michl
*Attorney, Agent, or Firm*—Joseph S. Nelson; William J. Farrington; Edward P. Grattan

[57] ABSTRACT

The invention relates to a process for dewatering an aqueous latex containing rubber particles grafted with alkenyl aromatic and alkenyl nitrile monomers and emulsified with an anionic surfactant wherein alkenyl aromatic and alkenyl nitrile monomers are dispersed in said latex along with a cationic surfactant in an amount sufficient to deemulsify said grafted rubber particles. The grafted rubber particles are extracted from the aqueous phase into the monomer phase as a liquid oil phase, with the aid of the cationic surfactant, said aqueous phase forming a separate water phase essentially free of said oil phase followed by separating said water phase from said liquid oil phase.

18 Claims, No Drawings

PROCESS FOR DEWATERING A GRAFTED RUBBER LATEX

This application is a continuation-in-part of copending application, Ser. No. 945,983 filed Sept. 27, 1978, now abandoned.

BAKCGROUND OF THE INVENTION

The processes conventionally used to dewater grafted rubber latices are usually based on the coagulation of the latex with an electrolyte to break the emulsion allowing the grafting rubber particles to agglomerate into rubber particles that can be screened or centrifuged off followed by washing the coagulum and drying in an air drier to a free flowing crumb.

In the production of ABS polyblends the crum is conventionally blended with styrene-acrylonitrile (SAN) copolymers to prepare rubber reinforced SAN polymers as ABS polyblends. The rubber becomes dispersed as rubber particles. Since these rubber particles are grafted with SAN, they are readily dispersed being compatible with the SAN matrix phase giving the polyblends excellent toughness for engineering uses.

Such methods of recovering or dewatering the grafted rubber particles has been found too costly because of yield losses in coagulation, washing and drying. More recently processes have been developed wherein the grafted rubber particles have been extracted from the aqueous latex with monomers forming a monomer phase and a separate water phase and separating the two phases. The latex is coagulated first to aid the extraction of the grafted rubber particles into the monomer phase as disclosed in U.S. Pat. No. 3,950,455. More recently U.S. Pat. No. 3,957,912 has disclosed the use of particular solvents in combination with the monomers to improve the efficiency of extracting the grafted rubber particles into the oil phase.

These dewatering processes have great utility in that the oil phase of monomers and dispersed grafted rubber particles can be subjected to mass polymerization to polymerize the monomers as a matrix phase having the grafted rubber particles dispersed therein to form ABS polyblends directly from the oil phase as a more efficient process.

The above processes are a step forward in the art, however, the oil phase whether liquid or in paste form retains considerable amounts of emulsified water, i.e., about 15 to 40% which must be removed in the polymerization step placing a load on the polymerization system in bringing the monomers to polymerizing temperatures.

The present process, using a cationic surfactant to bring the grafted rubber particles into the monomer as an oil phase, provides an oil phase considerably lower in emulsified water phase, i.e., about 1 to 4% and also substantially reduces any losses of emulsified oil phase into the water phase giving a highly efficient separation or latex dewatering process.

SUMMARY OF THE INVENTION

The present invention relates to a process for dewatering a grafted diene rubber aqueous latex comprising:
A. mixing a grafted diene rubber latex, said diene rubber being rubber particles grafted with alkenyl aromatic and alkenyl nitrile monomer, said rubber particles being emulsified in said aqueous latex by an anionic surfactant, with an alkenyl nitrile monomer and optionally an alkenyl aromatic monomer,
B. dispersing a cationic surfactant into said latex in an amount sufficient to deemulsify said grafted rubber particles,
C. extracting said grafted diene rubber particles into said monomers as a liquid oil phase, said aqueous latex forming a separate water phase, and
D. separating said water phase from said liquid oil phase.

PREFERRED EMBODIMENTS

The monomers used in the dewatering are alkenyl aromatic and alkenyl nitrile in ratios of 80:20 to 0:100, preferably the monomer mixture is at least 40% alkenyl nitrile and most preferably 45 to 70% by weight. The greater the weight percentage of the alkenyl nitrile monomer, the lower the viscosity of the liquid oil phase which provides a liquid oil phase of 20 to 100 cps when the monomer mixture is used in amounts of about 250 to 600 parts per 100 parts of grafted rubber particles. The lower the viscosity of the liquid oil phase, the more readily the liquid oil phase separates from the water phase allowing the phase to be separated by decanting, centrifuge, or gravity separation in tanks wherein the water phase can be drawn off from the dewatering means. Processwise, the latex can be charged to a stirred tank dewatering means followed by mixing in said monomers and dispersing in the cationic surfactant. The mixing and dispersing steps are carried out with sufficient agitation to uniformly disperse the monomers and surfactant into the latex and allow the extraction step to occur. Simple experiementation with conventional stirred tanks can insure the proper dispersion so that the extraction step can occur. Depending on the size of the tank and the amount of latex, the extraction can be carried out in a relatively short period of time sufficient to insure the diffusion of monomer and cationic surfactant to the grafted rubber particles extracting them into the monomer or oil phase. The mixing, dispersing and extracting steps are preferably carried out at ambient temperatures. Temperatures of from 0° C. to 160° C. can be used. Temperatures over about 80° C. should be carried out in closed vessels under pressure to prevent loss of monomers.

The latex can have about 2 to 75% by weight of grafted rubber particles emulsified with an anionic type surfactant conventionally used in emulsion graft polymerization. Such anionic surfactant can be selected from the group consisting of alkali and alkaline earth salts of fatty acids, e.g., oleates, palmitates, stearates, abietates or mixtures thereof, alkyl or alkaryl sulfonates, dialkyl sulfosuccinates, sulfated or sulfonates esters and ethers, sulfated or sulfonates amides and amines. Any anionic surfactant can be used that has water solubility and a surface activity sufficient to emulsify said grafted rubber particles having a particle size of about 0.05 to 1.0 microns.

The present process uses a cationis surfactant in an amount sufficient to deemulsify the grafted rubber particles in the aqueous latex so that they are more readily extracted into the monomer or oil phase. It is believed that the cationic surfactants neutralize the anionic surfactants stoichiometrically. Complete neutralization is not necessary to break the emulsion and stoichiometric amounts of the cationic surfactant equal to about 60 to 100% of the anionic surfactant can be used. Since the surface activity of both surfactants has been essentially negated, the oil phase becomes essentially free of a water phase and the water phase becomes essentially free of an oil phase providing efficient extraction, separation of phases and dewatering. In the present process, all of the water soluble components of the latex are efficiently partitioned into the water phase providing a monomer phase essentially free of such components which can be polymerized to polyblends with reduced haze levels.

The cationic surfactants used in the present process can be selected from the group consisting of pyridinium salts, amine and quaternary ammonium salts and imidazolium salts or mixtures thereof. Cationic surfactants such as imidazolium sulfate or chloride are preferred.

It has been found that the cationic surfactant can be used in smaller amount, e.g., as low as 10% the stoichiometric amount of the anionic surfactant present in the latex if an inorganic acid is added to the latex after the dispersion of said monomers and before the addition of the cationic surfactant, the amount of said acid being present in an amount necessary to bring the latex to a pH of about 1 to 3. The inorganic acids used can be, e.g., sulfuric or hydrochloric.

The grafted diene rubber particles contained in the latex can be considered to have a substrate of rubber and a superstrate of grafted monomers. In conventional latices the rubber particles are formed from conjugated alkadiene monomers, e.g., butadiene, isoprene and chloroprene or copolymers of diene monomers with alkenyl aromatic and alkenyl nitrile monomers. Preferably, the diene rubbers have a diene monomer content greater than 50%, most preferably 100%.

The grafted superstrate of the rubber particles can be comprised of alkenyl aromatic and alkenyl aromatic monomers preferably. Other alkenyl monomers, e.g., acrylates, maleates, etc. can be used. The alkenyl aromatic monomers are selected from the group consisting of styrene, alpha methyl styrene, chlorostyrene, bromostyrene, etc., and mixtures thereof. The alkenyl nitrile monomers are selected from the group consisting of acrylonitrile, methacrylonitrile, etc., and mixtures thereof. The ratio of alkenyl aromatic to alkenyl nitrile monomers used in grafting said rubber particles can be 85:15 to 15:85 with the amount of grafted superstrate monomers being 10 to 100 parts per 100 parts of rubber substrate. The grafted rubber particles have a particle size of about 0.05 to 1.0 microns as a weight average particle size diameter determined by a Centrifugal Photosedimentometer (Model 3000 Particle Size Analyzer, Martin Sweets Company, 3131 West Market Street, Louisville, Kentucky).

The practice of the present invention is illustrated by reference to the following examples which do not limit the scope of the invention as herein disclosed.

EXAMPLE 1

About 20.1 parts of styrene and 16.7 parts of acrylonitrile were added to 40 parts of a grafted butadiene rubber latex containing about 28.5% grafted rubber solids wherein the rubber was grafted with about 50 parts of styrene/acrylonitrile (70/30) per 100 parts of rubber. The latex was emulsified with an anionic surfactant available from the GAF Corporation as GAFAC RE-610, being a mixture of R—O—(CH$_2$OCH$_2$O)-$_n$—PO$_3$M$_2$ and (R—O—(CH$_2$OCH$_2$O)$_n$)$_2$—PO$_2$M wherein n is 1 to 40, R is an alkyl or alkaryl group and M is hydrogen, NH$_3$ or a alkali metal. The latex has a pH of about 5. The monomers were mixed in said latex with agitation for about 10 seconds. About 0.8 parts of 2 N sulfuric acid was then dispersed in the latex with agitation for about 10 seconds giving the latex a pH of about 3. A cationic surfactant was prepared from a 15% solution of substituted imidazoline of oleic acid titrated with an equivalent amount of sulfuric acid to form the amidazolinium salt. The imidazoline is available under the trade-name Monazoline O from the Monazoline Industries, Inc., Paterson, N.J. About 0.5 parts of alkylimidazolinium sulfate (15% solution) was then dispersed as a cationic surfactant in said latex with agitation for about 10 seconds extracting the grafted rubber particles into the monomer or oil phase followed by centrifuging the mixed oil and aqueous phases at 2000 rpm for 10 minutes separating said free water phase from said monomer or oil phase containing said grafted rubber particles. Analysis of the data is given in Table 1.

EXAMPLES 2-3

Example 1 was repeated varying the amounts of monomers and cationic surfactant with the data shown in Table 1.

COMPARATIVE EXAMPLES 3-6

Styrene and acrylonitrile monomer were dispersed in the grafted latex of Example 1 followed by an electrolyte to coagulate the grafted rubber particles into the monomer or oil phase and the water phase was separated by centrifugation. The data is shown in Table 1.

TABLE 1

| Part Charged | 1 | 2 | 3 | 4 | 5 | 6 |
|---|---|---|---|---|---|---|
| Latex | 40.0 | 40.3 | 40.0 | 45.0 | 46.1 | 40.6 |
| Styrene | 20.1 | 21.4 | 14.1 | 22.5 | 15.5 | 14.2 |
| Acrylonitrile | 16.7 | 16.6 | 20.4 | 18.0 | 23.0 | 20.0 |
| H$_2$SO$_4$ (2N) | 0.8 | 0.8 | 0.8 | 1.0 | 0.9 | 0.8 |
| MgSO$_4$ (26%) | | | | 1.0 | 0.5 | |
| Al$_2$(SO$_4$)$_3$ (12%) | | | | | | 0.5 |
| Cationic Surfactant | 0.5 | 1.0 | 1.5 | | | |
| TEST RESULTS | | | | | | |
| Water Phase | 29.4 | 29.5 | 29.5 | 9.5 | 1.5 | 6.4 |
| Oil Phase | 48.2 | 50.0 | 46.9 | 70.0 | 84.0 | 69.0 |
| Total Recovered | 77.6 | 79.5 | 76.4 | 79.5 | 85.5 | 75.5 |
| Total Charged | 78.1 | 80.1 | 76.8 | 79.9 | 86.0 | 76.1 |
| Solids in H$_2$O Phase | 0.2 | 0.15 | 0.3 | | | |
| Water in Oil Phase (%) | 1.2 | 1.2 | 1.4 | 70.0 | 94.5 | 78.0 |
| Dewatering Efficiency (%) | 98.8 | 98.8 | 98.6 | 30.0 | 4.5 | 22.0 |

It is evident from the comparative data that the cationic surfactant is superior to coagulants in bringing the grafted rubber particles into the monomer phase without emulsifying or inverting the water phase into the oil phase providing efficient dewatering.

EXAMPLE 7

Example 1 was repeated using the following formulation:

| | Parts |
|---|---|
| Latex | 100.00 |
| Styrene | 25.0 |
| Acrylonitrile | 49.0 |
| H$_2$SO$_4$ (2N) | 2.1 |
| Cationic surfactant | 1.4 |
| Test Results: | |

| | Parts |
|---|---|
| Oil phase | 103.1 |
| % H₂O in oil phase | 1.5 |
| Dewatering efficiency (%) | 98.5 |

EXAMPLE 8

Example 1 was repeated using the following formulation:

| | Parts |
|---|---|
| Latex | 100.0 |
| Styrene | 39.0 |
| Acrylonitrile | 49.0 |
| H₂SO₄ (2N) | 2.1 |
| Cationic surfactant | 1.4 |
| Test Results: | |
| Oil phase | 116.0 |
| % H₂O in oil phase | 1.3 |
| Dewatering efficiency (%) | 98.7 |

It is evident from Examples 7 and 8 that the dewatering efficiency is highly efficient with higher amounts of acrylonitrile in the dewatering monomer mixture.

EXAMPLE 9

Example 1 was repeated using the following formulation:

| | Parts |
|---|---|
| Latex* | 40 |
| Styrene | 14.0 |
| Acrylonitrile | 20.0 |
| H₂SO₄ (2N) | 0.8 |
| Cationic surfactant | 1.5 |
| Test Results: | |
| Oil phase | 45.4 |
| % H₂O in oil phase | 1.2 |
| Dewatering efficiency | 98.8 |

*Emulsified with anionic surfactant (sodium dodecyldephenylether disulfonate)

The above examples show the ability of cationic surfactants to neutralize the anionic surfactants. Being positively charged, they neutralize the negative anionic negatively charged surfactant on the grafted rubber particles, hence, allow the grafted rubber particles having a greater affinity for the monomers, to enter the monomer or oil phase more efficiently. The reaction product of a cationic surfactant and an anionic surfactant does not readily ionize, forming a hydrophobic salt wherein the surface activity of either surfactant is negated. Being hydrophobic the salts are soluble in the monomer-oil phase, hence, essentially depleting the water phase of emulsifiers providing a water phase free of surfactants or emulsified oil phase.

Cationic surfactants can be compounds containing at least one hydrophobic long chain R group usually derived from either fatty acids or petrochemical sources, and a positively charged nitrogen. The R group may be attached directly to the nitrogen or as in the case of stearyl trimethyl ammonium chloride, or indirectly as in the case of diisobutyl phenoxyethoxy ethyl dimethylbenzyl ammonium chloride. The nitrogen atom can also be part of a heterocyclic ring, as in the case of alkyl pyridinium salts or alkyl imidazolinium salts.

In commercial cationic surfactants, the long chain radical R, usually consists of a mixture of homologs. When the alkyl group is obtained from fatty acids, derived from a natural source such as tallow or coconut oil, R will vary not only in chain length but also in the degree of unsaturation of the fatty chain. When the R group is derived from petrochemical sources, a large number of components are found due to variations in molecular weight, degrees of branching, the presence of cylic impurities, or different ring substituents in aromatic systems.

Commercial cationic surfactants are readily available as set forth in "McCutcheon's Detergents and Emulsifiers Annual, North American Edition, 1978 Annual", John W. McCutcheon, Inc., Morristown, N.J.

The tendency of commercial cationic surfactants to be made up of complex mixtures must be considered when using such surfactants. Simple dewatering tests as shown in Example 1 can be used to determine the dewatering efficiency of a given commercial cationic surfactant.

The book, "Cationic Surfactants" by E. Jungermann and published by Mercel Dekker, Inc., New York, N.Y., also describes in detail, the cationic surfactants available, their preparation and properties. As set forth in Jungermann, suitable cationic surfactants include, e.g., the amine salts of e.g., the halogen, acetate or sulfate salts, such as dodecyl ammonium chloride, dodecylamine acetate, octadecyl amine salts, fatty esters of amines such as monoleate of triethanol amine, quaternary ammonium compounds such as dodecyltrimethyl ammonium chloride.

The heterocyclic ring type such as the alkylpyridium salts can have the alkyl group attached to the N atom being salts of the halogen acids or sulfate acids known as N-alkyl pyridinum salts. Others are 2-alkyl-N alkyl-pyridinium salts 4-alkyl-N-alkyl pyridinum salts, 3 alkyl-N-alkylpyridium salts, 2 or 4 (thioether-N-alkyl pyridinum salts, 4-(p-dialkylaminophenyl)-N-alkylpyridinum salts, ring acylated-N alkyl pyridinium salts, N-aralkyl pyridinium salts, N-(α-chloroalkyl, N-ether, acylphenethyl, N-ester, N-amide, N-thioether, N-sulfonyl and diquaternary pyridinium salts. Isoquinolenium, phthalozinium, benzimidazolium, benzothrazolium, benzotrazolium, pyrrolidium and imidazolinium derivatives can also be used. Saturated ring compounds including piperidinium, morpholinium thiamorpholinium, 1,3, benoxazinium, 1,3,5, trialkylhexahydro-1,3,5, triazinium N-hexahydroazepinium derivatives can be used.

The imidazolinium derivatives have been found to be highly efficient dewatering agents. The imidazoline can be prepared from diethylenediamine derivatives or hydroxyethyl ethylene diamine reacted with a carboxylic acid. This leaves a free hydroxyl or amino group on a side chain, e.g.

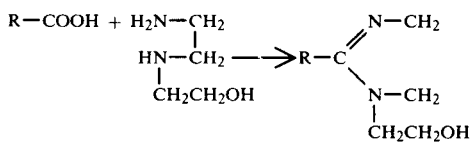

as an imidazoline

R is prepared from a fatty acid, e.g., from tallow, coconut, caprilic, isostearic, oleic or tall oil.

The imidazolinium salts are obtained by reacting imidazoline with short or long chain alkyl halide, ethylchloroacetate, chloroacetamide, dimethylsulfate to alkylate the imidazoline and form a salt, or acids, e.g., hydrochloric, sulfuric, phosphoric or acetic in an equivalent amount to form a salt:

e.g., 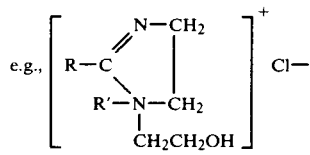 Cl− as an imidazolinium salt where R′ can be e.g., methyl or benzyl groups.

Such imidazoline compounds are available from the Mona Industries, Inc., Paterson, N.J. under the tradename Monazoline C, Cy, IS, O or T and easily converted to the imidazolinium salt by titration with acids that allow sufficient dissociation of the cationic surfactant to react with or displace the anionic surfactants on the grafted rubber particles, at low pH, so that the particles can easily enter the oil phase and do not occlude water in the oil phase.

The cationic surfactants were tested as dewatering agents alone in the following examples:

EXAMPLE 10

Example 1 was repeated without sulfuric acid addition.

|  | Parts |
| --- | --- |
| Latex | 40 |
| Styrene | 22 |
| Acrylonitrile | 30 |
| Cationic Surfactant (10%)* | 9.5 |
| Test Results: |  |
| Oil dispersion | 62.2 |
| % H$_2$O in monomer dispersion | 1.4 |
| Dewatering efficiency (%) | 97 |

*Substituted imidazoline from isostearic acid and benzyl chloride available under the trade name Schercoquat IIB from Scher Chemicals, Inc., Clifton, New Jersey (10% in water).

EXAMPLE 11

Example 10 was repeated using acrylonitrile and the cationic surfactant alone.

|  | Parts |
| --- | --- |
| Latex | 40 |
| AN | 32 |
| Cationic Surfactant (10%)* | 8.1 |
| Test Results: |  |
| Oil dispersion | 42.8 |
| % H$_2$O in monomers dispersion | 2.5 |
| Dewatering efficiency (%) | 96 |

*(as described in Example 10)

It is evident that the cationic surfactant is an efficient dewatering agent alone wherein the grafted rubber particles are partitioned into the oil or monomer phase with minor amounts of occluded water providing an efficient dewatering process.

The cationic surfactants include but are not limited to the classes of emulsifiers disclosed supra, e.g., acid salts of primary, secondary and tertiary amines and the quaternary ammonium types or the acid pyrindinium and imidazolinium salts. They can include fatty amides derived from disubstituted diamines and non-nitrogen containing surfactants, e.g., sulfoxonium and sulfonium compounds, phosphonium compounds, iodonium compounds and isothioruronium compounds and others known as cationic surfactants.

The cationic surfactants can include salts of copolymers derived from ethylene diamine to which ethylene and propylene oxides are sequentially added as block copolymers. These copolymers can have a molecular weight of about 1500 to 40,000 with 5 to 90% of the copolymer being polyoxyethylene. Each polyoxyethylene chain can have a molecular weight of 44 to 1100 and each polyoxypropylene chain has a molecular weight of 290 to 8700. The block-polyol-copolymer based on ethylene diamine has the formula:

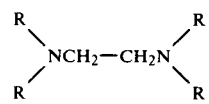

wherein R is (CH$_2$H$_4$O)$_x$(CH$_3$H$_6$O)$_y$H. The aliphatic primary diamine block polyol copolymers are preferred and are available from BASF Wyandotte Corporation, Parsippany, N.J., under the Trademark, TETRONIC R Polyol Series. Other polyol block copolymers can be derived from compounds having one or more nitrogen atoms, up to six carbon atoms and may contain two to six reactive hydrogen atoms, e.g., ethylene diamine, triethylene, tetramine, n-butyl amine, acetamide, 1,6-hexanediamine, aromatic amines, heterocyclic compounds., alkanolamines, etc.

The block copolymers are prepared by adding ethylene oxide first to the diamine followed by the propylene oxide each being added as a alkylene oxide block. The polyoxyethylene blocks are considered to be hydrophilic and the polyoxypropylene blocks are considered to be hydrophobic, hence, the hydrophilic-hydrophobic balance can be varied by relative amounts of polyoxyethylene and polyoxypropylene contained with the block copolymer containing 5 to 90% by weight of the polyoxyethylene block. Such polyol surfactants based on amines are described in the publication, Block and Graft Copolymerization, Vol. 2, R. J. Ceresa, published by John Wiley and Sons, New York, Pages 89–103.

The polyol block copolymers are used in acid solutions such that they form the salt of the acid and become cationic surfactants.

The solutions can be aqueous or water miscible solvents such as alcohols. The preferred acids are mineral acids such as sulfuric and hydrochloric, etc., that increase the solubility of the polyol copolymer in water and form polyol copolymer salts that function as cationic surfactants. Aqueous solutions containing 1 to 5% by weight acid can be used to form acid solutions having present 1 to 25% by weight of the polyol copolymer present as a cationic salt surfactant having, e.g., the proposed formula:

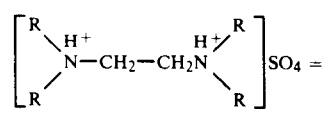

EXAMPLES 12-15

Example 1 was essentially repeated using the materials indicated in Table 2. The test results on dewatering are tabulated.

TABLE 2

| Parts of Materials | 12 | 13 | 14 | 15 |
| --- | --- | --- | --- | --- |
| Graft latex[1] | 100 | 100 | 100 | 100 |
| Acrylonitrile | 72 | 50 | 40 | 30 |
| Styrene | 18 | 40 | 50 | 60 |
| Cationic Surfactant[2] | 5.4 | 5.4 | 5.4 | 5.4 |
| Water phase | clear | clear | clear | clear |
| % H$_2$O in oil phase | 1.0 | 0.8 | 0.6 | 0.7 |
| % Dewatering efficiency | 98 | 99 | 99 | 99 |

[1] latex of Example 1
[2] cationic surfactant-15% by weight solution in 5% by weight H$_2$SO$_4$ water solution. Surfactant is TETRONIC 50R1 from BASF Wyandotte having polyoxylene propylene blocks with a molecular weight of 1500-2000 and about 10% by weight of a polyoxyethylene block grafted to ethylene diamine with structure shown supra.

The preferred amine cationic surfactants can be polyalkylene oxide block copolymer amine salts having amines selected from the group consisting of mono, di, tri and tetrafunctional amines, said amine salt being a salt of a solubilizing acid, such as sulfuric, hydrochloric, acetic and phosphoric or mixtures thereof. The amine polyol block copolymers or polyalkylene oxide block copolymer amines have tertiary nitrogen atoms which have cationic properties. When the amine block copolymers are converted to a salt with a solubilizing acid they become water soluble salts having cationic properties as described supra, e.g., polyol amine hydrochloride or polyol amine hydrosulfate.

What is claimed is:

1. A process for dewatering a grafted diene rubber aqueous latex comprising:
   A. mixing a grafted diene rubber latex, said diene rubber being rubber particles grafted with alkenyl aromatic and alkenyl nitrile monomer, said rubber particles being emulsified in said aqueous latex by an anionic surfactant, with an alkenyl nitrile monomer and optionally an alkenyl aromatic monomer,
   B. dispersing a cationic surfactant into said latex an amount sufficient to deemulsify said rubber particles,
   C. extracting said grafted diene rubber particles into said monomers as a liquid oil phase, said aqueous latex forming a separate water phase, and
   D. separating said water phase from said liquid oil phase, said oil phase having said grafted diene rubber particles evenly dispersed therein and being essentially free of said water phase.

2. A process of claim 1 wherein said monomers are styrene and acrylonitrile, said monomers being present in amount of about 250 to 600 parts per 100 parts of grafted rubber solids in said latex.

3. A process of claim 2 wherein the ratio of styrene to acrylonitrile used in step (B) is 80:20 to 0:100.

4. A process of claim 1 wherein an inorganic acid is added to said latex after the mixing of said monomers in step (A) bringing said latex to a pH of about 1 to 3 followed by the dispersing of said cationic surfactant in an amount sufficient to deemulsify said grafted rubber particles.

5. A process of claim 1 wherein said diene rubber is selected from the group consisting of polybutadiene, polychloroprene, polyisoprene and copolymers of butadiene-styrene and butadiene-acrylonitrile.

6. A process of claim 1 wherein said grafted rubber particles have a average particle size diameter of about 0.05 to 1.0 microns.

7. A process of claim 1 wherein said latex has present about 2 to 75% by weight of said grafted rubber particles.

8. A process of claim 1 wherein said grafted rubber particles are grafted with about 10 to 100 parts of said monomers per 100 parts of rubber, the ratio of alkenyl aromatic monomer to alkenyl nitrile monomer being about 85:15 to 15:85.

9. A process of claim 1 wherein said liquid oil phase has a viscosity of about 20 to 100 cps such that said water phase is readily separated from said liquid oil phase.

10. A process of claim 1 wherein said cationic surfactant is selected from the group consisting of pyridinium salts, imidazolinium salts, quaternary ammonium salts, amine salts or mixtures thereof.

11. A process of claim 1 wherein said cationic surfactant is an alkylimidazolium chloride.

12. A process of claim 1 wherein said cationic surfactant is an alkylimidazolium sulfate.

13. A process of claim 1 wherein said cationic surfactant is a polyalkylene oxide block copolymer amine salt, said amine being selected from the group consisting of mono, di, tri and tetrafunctional amines, said amine salt being a salt of a solubilizing acid.

14. A process of claim 13 wherein said polyalkylene oxide block copolymer moiety is —(C$_2$4O)$_x$(C$_3$H$_6$O)$_y$H wherein the molecular weight of the (C$_3$H$_6$O) block is about 290 to 8700, said (C$_2$H$_4$O) block is about 44 to 1100 and is present in said block copolymer in an amount of about 5 to 90% by weight, said block copolymer amine moiety having a molecular weight of about 1500 to 40,000.

15. A process of claim 13 wherein said solubilizing acid is sulfuric, hydrochloric, acetic and phosphoric or mixtures thereof.

16. A process of claim 13 wherein said polyalkenyl oxide block copolymer amine salt is a polyoxyethylene-polyoxypropylene-ethylene diamine, hydrosulfate salt or hydrochloride salt.

17. A process of claim 1 wherein said anionic surfactant is selected from the group consisting of alkali and alkaline earth salts of fatty acids, alkyl sulfonic acids and alkylaryl sulfonic acids and mixtures thereof.

18. A process for dewatering a grafted diene rubber aqueous latex comprising:
   A. mixing a grafted diene rubber latex, said diene rubber being rubber particles grafted with alkenyl aromatic and alkenyl nitrile monomer, said rubber particles being emulsified in said aqueous latex by an anionic surfactant, with said latex an acrylonitrile monomer and optionally a styrene monomer,
   B. dispersing a cationic surfactant into said latex in an amount sufficient to deemulsify said grafted rubber particles,
   C. extracting and dispersing said grafted diene rubber particles into said monomers uniformly and essentially free of water forming a liquid oil phase, said aqueous latex forming a separate water phase, and
   D. separating said water phase from said liquid oil phase.

* * * * *